United States Patent
Love et al.

(10) Patent No.: US 6,304,337 B1
(45) Date of Patent: Oct. 16, 2001

(54) STOCHASTIC METHOD OF ENLARGING A VISUAL IMAGE

(75) Inventors: Shaun Timothy Love; Ning Ren, both of Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 09/217,284

(22) Filed: Dec. 21, 1998

(51) Int. Cl.$^7$ .................................................. G06K 15/00
(52) U.S. Cl. ............................................ 358/1.2; 358/1.9
(58) Field of Search ............................... 358/1.2, 1.9, 1.1, 358/1.11, 1.13, 1.15, 1.18, 507, 517, 518, 525, 528, 527, 533, 532, 534–538, 428–429, 452, 453, 454–459, 466, 298, 523, 530, 443, 448; 382/162, 167, 299, 298, 300; 345/589, 591, 596, 597, 600, 603, 604, 606, 616, 626

(56) References Cited

U.S. PATENT DOCUMENTS

| | | |
|---|---|---|
| 4,297,744 | 10/1981 | Hoffmann et al. ..................... 364/703 |
| 4,394,693 | 7/1983 | Shirley .................................. 358/298 |
| 5,062,724 | 11/1991 | Iizuka .................................... 400/121 |
| 5,377,041 | 12/1994 | Spaulding et al. .................... 358/518 |
| 5,383,730 * | 1/1995 | Takahashi ............................. 358/1.2 |
| 5,502,792 * | 3/1996 | Chen et al. ............................ 358/1.2 |
| 5,548,689 | 8/1996 | Poppenga et al. .................... 358/1.9 |
| 5,548,690 | 8/1996 | Shimada ............................... 358/1.13 |
| 5,553,201 | 9/1996 | Muramatsu ........................... 358/1.9 |
| 5,559,930 | 9/1996 | Cariffe et al. ......................... 358/1.2 |
| 5,574,832 | 11/1996 | Towery et al. ........................ 358/1.9 |
| 5,579,445 * | 11/1996 | Loce et al. ............................ 358/1.2 |
| 5,644,648 | 7/1997 | Bose et al. ............................ 382/177 |
| 5,657,430 * | 8/1997 | Smith et al. ........................... 358/1.9 |
| 5,689,624 | 11/1997 | Allegrezza ............................ 358/1.13 |
| 5,729,358 | 3/1998 | Uchiyama et al. ................... 358/1.2 |
| 5,745,659 | 4/1998 | Rigau Rigau et al. ............... 358/1.2 |
| 5,745,660 | 4/1998 | Kolpatzik et al. .................... 358/1.8 |
| 6,115,031 * | 9/2000 | Love et al. ............................ 345/603 |
| 6,256,109 * | 7/2001 | Rosenbaum et al. ................ 358/1.1 |

* cited by examiner

*Primary Examiner*—Dov Popovici
(74) *Attorney, Agent, or Firm*—Taylor & Aust, P.C.

(57) ABSTRACT

A method of enlarging a visual image including an M by N matrix of pixels, with each of the pixels having at least one color component, and each of the color components having one of a plurality of color values, includes the step of selecting a two pixel by two pixel submatrix within the M by N matrix. An enlarged image area, including an X by Y matrix of pixels corresponding to the two pixel by two pixel submatrix of the M by N matrix, is defined. The X by Y matrix includes four corner pixels and a plurality of intervening pixels, with each of X and Y being greater than two. Each of the pixels in the X by Y matrix has X and Y coordinates. The color value of the at least one color component of each of the pixels in the two pixel by two pixel submatrix of the M by N matrix is assigned to a corresponding one of the four corner pixels in the corresponding X by Y matrix. The X and Y coordinates of a selected intervening pixel of the corresponding X by Y matrix are identified. A first random number is added to the X coordinate of the selected intervening pixel to obtain a randomized X coordinate. A second random number is added to the Y coordinate of the selected intervening pixel to obtain a randomized Y coordinate. A closest one of the four corner pixels which is closest to a point associated with each of the randomized X coordinate and the randomized Y coordinate is determined. The color value of the at least one color component of the closest one of the four corner pixels is duplicated in the selected intervening pixel.

20 Claims, 2 Drawing Sheets

THRESHOLD MATRIX

STOCHASTIC METHOD OF ENLARGING A VISUAL IMAGE

BACKGROUND OF THE INVENTION

1. Field of the Invention

The present invention relates to a method of enlarging a visual image, and, more particularly, to a method of enlarging a two dimensional visual image including a plurality of pixels.

2. Description of the Related Art

In many types of image processing, there is a need for a visual image, formed by a two dimensional matrix of pixels, to be scaled up or enlarged. For instance, when an image is sent to a printer, the resolution of the image data may be lower than the resolution of the printer, which requires that the image be enlarged for printing. It is quite common for images viewed on a computer monitor to have a low spatial resolution. Dimensions of 640 pixels by 480 pixels are commonly acquired by frame grabbers using a video camera or tape as the input source. With the growth of the Internet, use of low resolution images has become even more common. On a cathode-ray tube (CRT) monitor, such low resolution images have an acceptable appearance by virtue of the CRT being a low resolution device and being well suited to a low resolution image. This is not the case, however, for printers, which commonly have a resolution of 600 dots per inch (dpi) or higher. If a user prints a 640 pixel by 480 pixel image on a letter size page, each pixel of the image corresponds to a large matrix or block of dots on the printed page.

For example, assuming a half inch margin at each edge of a page, an 8.5 inch by 11 inch letter size page contains a 4500 by 6000 matrix of dots. That is, the letter size page contains a matrix measuring 7.5 inch×600 dpi=4500 dots by 10 inch×600 dpi=6000 dots.

Thus, the 640 pixel by 480 pixel image must be enlarged to a 6000 by 4500 matrix of dots on the printed page.

In order to enlarge the original image, the image information within each pixel of the image is assigned to a corresponding pixel in the enlarged image of higher resolution such that the pixels of the original image are spread out across the pixels of the enlarged image. In other words, the pixels of the original image are separated by intervening blank pixels in the enlarged image. One method of "filling in" or placing image data with the intervening blank pixels is to simply replicate each of the original pixels in a respective group of intervening pixels which surrounds the original pixel. However, this results in a visually unappealing "blockiness" in the enlarged image, with sharp contrasts between adjacent blocks of uniform color. If the color values of two adjacent blocks are more than only slightly different, an abrupt color transition will be quite noticeable at the edge where the two blocks meet.

Another method of filling in the intervening blank pixels is to interpolate the pixel data of the original image. Rather than simply replicate the same value throughout an entire block of pixels in the enlarged image, interpolation produces color values that flow smoothly and continuously from one input color value to the next. Different interpolation methods exist, but the most straightforward is bilinear interpolation. Bilinear interpolation uses the smallest square, as defined by four pixels of the original image, which contains the intervening pixel whose color value is to be computed. FIG. 1 shows an intervening point P having coordinates (x,y) and being disposed within a unit square defined by four original image pixels P0, P1, P2 and P3. Pixel P0 is defined as the origin of the square, and thus is assigned coordinates (0,0). The diagonally opposite corner pixel P3 is assigned coordinates (1,1). Using bilinear interpolation, a color value p at pixel P is determined by the following equation:

$$p = x*y*p3 + (1-x)*y*p2 + x*(1-y)*p1 + (1-x)*(1-y)*p0,$$

wherein p0, p1, p2 and p3 are defined as the color values at pixels P0, P1, P2 and P3, respectively. Applying bilinear interpolation to image scaling requires solving the above equation for every intervening pixel in the enlarged image. Thus, while interpolation improves the visual quality of the resulting enlarged image by eliminating the blockiness of the first method discussed above, the computational time required to perform interpolation is quite high.

On a printer, the above color values are not displayed directly. This is because a printer is incapable of displaying as broad a range of color values as the pixels contain. Rather, a printer may only be capable of bi-level output. In such bi-level output, at a certain point on the print medium, a dot of a particular color is either printed, or it is not. A process referred to as "halftoning" is used to convey the color values of the visual image to the print medium with a bi-level output. Halftoning can be accomplished using threshold arrays, error diffuision or other techniques, such methods being well known to those skilled in the art. In halftoning, a dot is placed at a given point on the print medium only if the color value of the corresponding pixel exceeds a threshold value. Thus, the higher the color values in a certain area of the image, the more dots that are printed on the print medium. The human eye tends to average the printed dots and white spaces together as a shade of a color. Moreover, the various ratios of dots to blank spaces in different areas of the printed display are perceived as being different shades of color, corresponding to the color values of the image.

Bi-level printing based upon a comparison of the color value of each pixel to the same constant threshold value would result in undesirable artifacts in the printed image, however. Similar to the blockiness described above, these artifacts may include abrupt color transitions in areas where color values to one side of a line are below the threshold value, and color values to the other side of the line are above the threshold value. To eliminate such artifacts, the single threshold value is replaced by a matrix of various threshold values, as shown in FIG. 4. Since color values typically have 256 levels, the threshold matrix can be a sixteen row by sixteen column arrangement of cells, with each cell containing a threshold value ranging between 0 and 255. For ease of illustration, however, the threshold matrix of FIG. 4 is shown as a four cell by four cell matrix having threshold values between zero and fifteen. In a process called "masking", the threshold matrix can be thought of as being superimposed over the image to be printed, with each cell of the threshold matrix corresponding to a pixel in the image. In order to determine whether to print a dot, the color value of each pixel of the image is compared to the threshold value within the corresponding cell of the threshold matrix. In essence, the color value of the pixel is a probability indicating the likelihood that a dot will be printed at the corresponding point on the print medium. The threshold matrix is then applied to an adjacent block of pixels, and the process continues until all of the pixels of the image have been masked. Separate threshold matrices can be used for each color component of the printed image, such as cyan, magenta and yellow.

SUMMARY OF THE INVENTION

The present invention provides a method of enlarging a visual image by interpolating, with a minimum of computational time, the color values of intervening pixels in the enlarged image.

The invention comprises, in one form thereof, a method of enlarging a visual image including an M by N matrix of pixels. Each of the pixels has at least one color component, and each of the color components has one of a plurality of color values. A two pixel by two pixel submatrix is selected within the M by N matrix. An enlarged image area, including an X by Y matrix of pixels corresponding to the two pixel by two pixel submatrix of the M by N matrix, is defined. The X by Y matrix includes four corner pixels and a plurality of intervening pixels, with each of X and Y being greater than two. Each of the pixels in the X by Y matrix has X and Y coordinates. The color value of the at least one color component of each of the pixels in the two pixel by two pixel submatrix of the M by N matrix is assigned to a corresponding one of the four corner pixels in the corresponding X by Y matrix. The X and Y coordinates of a selected intervening pixel of the corresponding X by Y matrix are identified. A first random number is added to the X coordinate of the selected intervening pixel to obtain a randomized X coordinate. A second random number is added to the Y coordinate of the selected intervening pixel to obtain a randomized Y coordinate. A closest one of the four corner pixels which is closest to a point associated with each of the randomized X coordinate and the randomized Y coordinate is determined. The color value of the at least one color component of the closest one of the four corner pixels is duplicated in the selected intervening pixel.

An advantage of the present invention is that the computational time required to interpolate the color values of intervening pixels in an enlarged visual image is greatly reduced.

Another advantage is that abrupt color transitions between blocks of uniform color in the enlarged visual image are eliminated.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
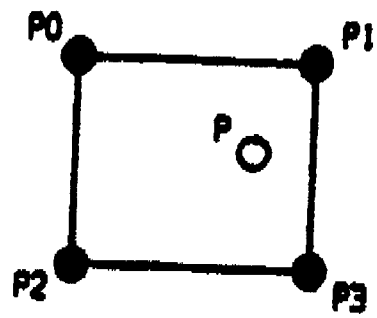
FIG. 1 is a schematic view of four pixels of an original visual image defining a unit square containing an intervening pixel of an enlarged version of the original visual image.

Referring now to FIG. 1, there is shown four pixels P0, P1, P2 and P3 forming a two by two matrix selected from an original visual image. Each of the four pixels defines a respective corner of a unit square. In enlarging the original visual image, pixels P0, P1, P2 and P3 are spread apart such that the four pixels are separated by a plurality of intervening pixels P, one of which is shown.

Figure 2:
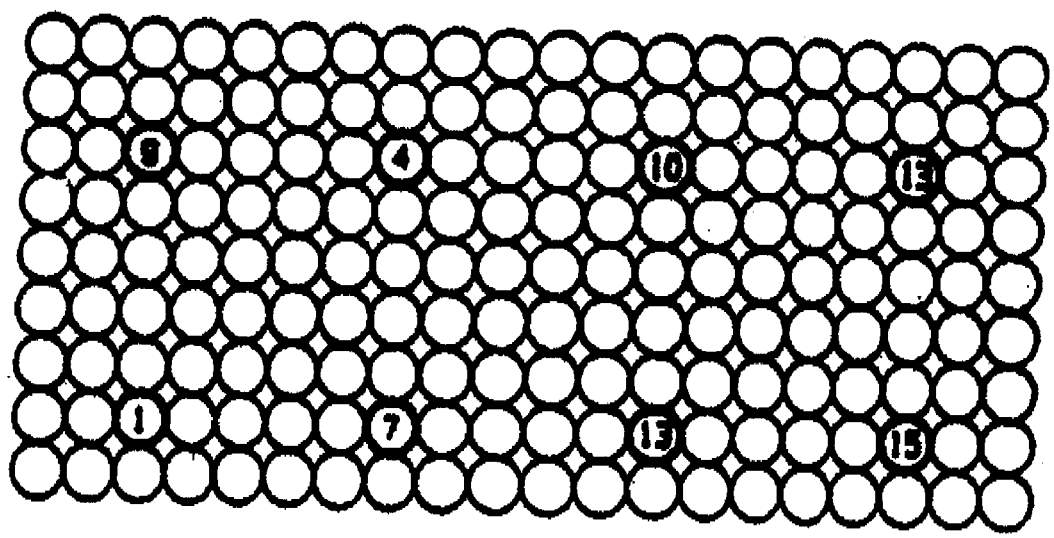
FIG. 2 is a schematic view of eight pixels, with color values, of an original visual image, being separated by intervening blank pixels in an enlarged version of the original visual image.

FIG. 2 shows eight pixels of an original image, with each of the eight pixels having a respective color value. The eight pixels are spread out across an enlarged visual image such that the eight pixels are separated by intervening blank pixels.

Assuming that the intervening pixels are to be assigned color values by the above-described known process of bilinear interpolation, two key observations are made. First, the average of the interpolated color values of the intervening pixels within a square defined by four image pixels will be equal to the average of the color values of the four image pixels. Second, on a printer, or any other device which uses halftoning, the color values of the interpolated pixels are not directly displayed. Rather, a dot is printed at each location based upon a comparison of the corresponding pixel's color value to a threshold value, and the smoothing tendency of the human eye to perceive a mixture of dots and white spaces as a shade of color is relied upon. From these observations, it can be concluded that it is not critical for the color value within each intervening pixel be precisely calculated. It is only necessary for the average color value of the intervening pixels to be approximately equal to the average color value of the four image pixels which define the square. Still, abrupt color transitions must be avoided.

Figures 3, 4:
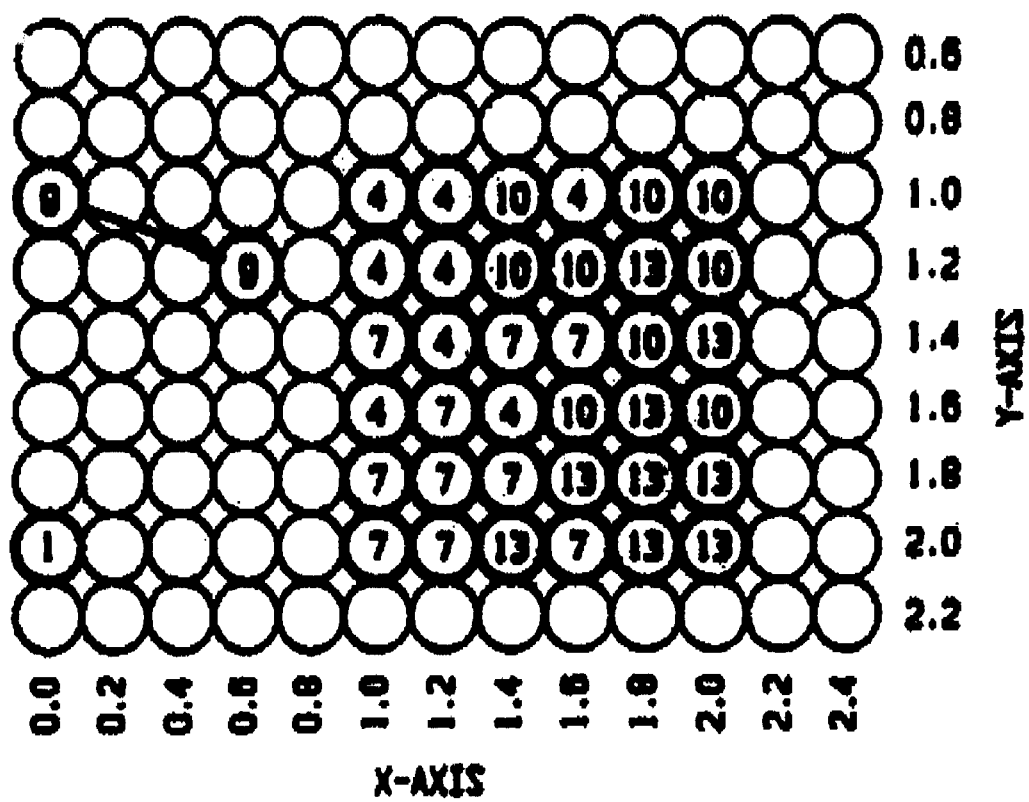
FIG. 3 is a fragmentary view of FIG. 2, wherein selected intervening pixels have been assigned color values by one embodiment of the method of the present invention.
FIG. 4 is a threshold matrix used in one embodiment of the present invention.

The method of the present invention employs a process referred to as "stochastic interpolation" to assign the color value of one of the four corner image pixels to each of the intervening pixels within the square. In the method, there is a tendency for each intervening pixel to be assigned the color value of the closest of the four corner image pixels, thus ensuring an accurate replication of the original image. However, an element of randomness is also introduced in order to create a mixture or interspersion of the color values within the square. Thus, abrupt color transitions in the enlarged image are avoided. In addition, in the method of the present invention, the average color value of the intervening pixels is substantially equal to the average of the color values of the four corner image pixels. Thus, an appropriate number of dots are produced on the print medium, creating the perception of a correct shade of color. The same average color value is achieved with the method of the present invention as with bilinear interpolation, but the costly calculations associated with bilinear interpolation are avoided. FIG. 3 illustrates a portion of the image of FIG. 2, wherein selected intervening pixels have been assigned color values by the method of the present invention. As can be readily observed, in the square defined by the four corner image pixels having the color values 4, 10, 13 and 7, each of the intervening pixels has been assigned one of these four color values.

As an example of how color values are assigned to intervening pixels by the method of the present invention, the assignment of a color value to the intervening pixel located at coordinates (0.6, 1.2) is examined. A first random number, ranging between −0.5 and 0.5 and having a zero mean, is added to the X coordinate of 0.6. Assuming, for example, the random number is −0.3, it is added to 0.6 to arrive at a randomized X coordinate of 0.3. Next, 0.3 is rounded to the nearest X coordinate of one of the four corner pixels. Since 0.3 is closer to 0.0 than to 1.0, it is rounded to 0.0. Another random number, having the same mean and range as the first random number, is then added to the Y coordinate of the intervening pixel. Assuming, this time, that the random number is 0.2, it is added to 1.2 to arrive at a randomized Y coordinate of 1.4. Next, 1.4 is rounded to the nearest Y coordinate of one of the four corner pixels. Since 1.4 is closer to 1.0 than to 2.0, it is rounded to 1.0. Thus, the corner pixel having the coordinates (0.0, 1.0) is determined to be the closest of the four corner pixels to the point associated with the randomized coordinates (0.3, 1.4). Lastly, the color value 9 of corner pixel (0.0, 1.0) is duplicated in intervening pixel (0.6, 1.2), as indicated by the arrow.

By the random numbers having a mean of zero, each of the four corner pixels should be equally represented in the intervening pixels. The range of the random numbers should be no greater than a difference between the X coordinates or the Y coordinates of two diagonally opposite corner pixels. For instance, the difference in the X coordinates of the corner pixels having the color values 9 and 7 is (1.0−0.0), or 1.0. The random number of the example ranges between −0.5 and 0.5, and therefore has a range of 1.0. If the random number were to have a range greater than the difference in the X or Y coordinates of corner pixels, it would be possible for an intervening pixel to be assigned the value of an image pixel that is not one of the four corner pixels defining its square. The random number may have any distribution characteristic, such as a uniform distribution or a bell-shaped distribution, for example. One possible source of values for the random numbers is the threshold matrix, which would prevent the occurrence of moire between the threshold matrix and the random numbers.

The above-described method of the present invention can be repeated for each of the other intervening pixels in the unit square and for each of the intervening pixels in the other unit squares of the enlarged image. A masking process, as described above, may be applied to the enlarged image using at least one threshold matrix, also known as a "threshold array", such as shown in FIG. 4. Alternatively, it is possible for halftoning to be performed by error diffusion.

In the example, only a single color value is shown as being included in each pixel. However, each pixel may have several color values that are each associated with a respective one of several color components, such as cyan, magenta and yellow. Each of these separate color values would be duplicated from the corner pixels into the intervening pixels.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of enlarging a visual image, the visual image including an M by N matrix of pixels, each of the pixels having at least one color component, each of the color components having one of a plurality of color values, said method comprising the steps of:

dividing the M by N matrix into a plurality of two pixel by two pixel submatrices;

defining an enlarged image area including a plurality of X by Y matrices of pixels, each of said X by Y matrices corresponding to a respective said two pixel by two pixel submatrix of the M by N matrix, each of said X by Y matrices including four corner pixels and a plurality of intervening pixels, each of X and Y being greater than two, each of said pixels in each said X by Y matrix having an X coordinate and a Y coordinate;

assigning a color value of the at least one color component of each of said pixels in a selected said two pixel by two pixel submatrix of the M by N matrix to a corresponding one of said four corner pixels in a corresponding said X by Y matrix;

identifying said X coordinate and said Y coordinate of a selected said intervening pixel of said corresponding X by Y matrix;

adding a first random number to said X coordinate of said selected intervening pixel to obtain a randomized X coordinate;

adding a second random number to said Y coordinate of said selected intervening pixel to obtain a randomized Y coordinate;

determining a closest one of said four corner pixels which is closest to a point associated with each of said randomized X coordinate and said randomized Y coordinate;

duplicating the color value of the at least one color component of said closest one of said four corner pixels in said selected intervening pixel;

first repeating said identifying, adding, determining and duplicating steps for each of said intervening pixels in said corresponding X by Y matrix; and second repeating said assigning step and said first repeating step for each of said two pixel by two pixel submatrices of said M by N matrix.

2. The method of claim 1, comprising the further steps of:

defining at least one threshold matrix, each said threshold matrix having a plurality of rows of cells and a plurality of columns of cells, each of said pixels in said enlarged image area corresponding to one of said cells of each said threshold matrix;

assigning a threshold color value to each individual said cell within each said threshold matrix; and reproducing each of said pixels of said enlarged image area, dependent upon said color values of said pixels of said enlarged image area and said threshold color values of each said threshold matrix.

3. The method of claim 2, wherein said at least one threshold matrix comprises a first threshold matrix corresponding to cyan, a second threshold matrix corresponding to magenta, and a third threshold matrix corresponding to yellow.

4. The method of claim 3, wherein the at least one color component comprises at least one of cyan, magenta and yellow.

5. The method of claim 2, wherein said reproducing step includes the substep of masking each of said pixels of said enlarged image area using each said threshold matrix.

6. The method of claim 2, wherein said reproducing step is dependent upon the color values of the color components of the pixels in the M by N matrix being greater than corresponding said threshold color values in said threshold matrix.

7. The method of claim 2, comprising the further step of using at least one of said threshold matrix to formulate at least one of said first random number and said second random number.

8. The method of claim 1, wherein said first random number has a range substantially equal to a difference in said X coordinates of two diagonally opposite ones of said four corner pixels.

9. The method of claim 8, wherein said second random number has a range substantially equal to a difference in said Y coordinates of said two diagonally opposite ones of said four corner pixels.

10. The method of claim 9, wherein each of said first random number and said second random number has a mean substantially equal to zero.

11. The method of claim 1, wherein said M by N matrix of pixels comprises a 640 by 480 matrix of pixels.

12. The method of claim 1, wherein said step of determining a closest one of said four corner pixels includes the substeps of:

rounding said randomized X coordinate to a closest X coordinate associated with at least one of said four corner pixels; and rounding said randomized Y coordinate to a closest Y coordinate associated with at least one of said four corner pixels.

13. The method of claim 1, wherein said closest one of said four corner pixels is separated from said point associated with each of said randomized X coordinate and said randomized Y coordinate by a smallest distance among said four corner pixels, said distance being defined as:

$$[(X_{corner}-X_{randomized})^2+(Y_{corner}-Y_{randomized})^2]^{1/2},$$

wherein $X_{corner}$ is the X coordinate of the corner pixel;

$X_{randomized}$ is the randomized X coordinate;

$Y_{corner}$ is the Y coordinate of the corner pixel; and $Y_{randomized}$ is the randomized Y coordinate.

14. A method of enlarging a visual image, the visual image including an M by N matrix of pixels, each of the pixels having at least one color component, each of the color components having one of a plurality of color values, said method comprising the steps of:

selecting a two pixel by two pixel submatrix within the M by N matrix;

defining an enlarged image area including an X by Y matrix of pixels corresponding to said two pixel by two pixel submatrix of the M by N matrix, said X by Y matrix including four corner pixels and a plurality of intervening pixels, each of X and Y being greater than two, each of said pixels in said X by Y matrix having an X coordinate and a Y coordinate;

assigning a color value of the at least one color component of each of said pixels in said two pixel by two pixel submatrix of the M by N matrix to a corresponding one of said four corner pixels in said corresponding X by Y matrix;

identifying said X coordinate and said Y coordinate of a selected said intervening pixel of said corresponding X by Y matrix;

adding a first random number to said X coordinate of said selected intervening pixel to obtain a randomized X coordinate;

adding a second random number to said Y coordinate of said selected intervening pixel to obtain a randomized Y coordinate;

determining a closest one of said four corner pixels which is closest to a point associated with each of said randomized X coordinate and said randomized Y coordinate; and duplicating the color value of the at least one color component of said closest one of said four corner pixels in said selected intervening pixel.

15. The method of claim 14, comprising the further step of halftoning said duplicated color value.

16. The method of claim 15, wherein said halftoning step is performed with at least one threshold array.

17. The method of claim 15, wherein said halftoning step is performed by error diffusion.

18. A method of enlarging a visual image, the visual image including an M by N matrix of pixels, each of the pixels having at least one color component, each of the color components having one of a plurality of color values, said method comprising the steps of:

providing an X by Y matrix of pixels, X being greater than M, Y being greater than N, each of said pixels in said X by Y matrix having an X coordinate relative to an X direction and a Y coordinate relative to a Y direction;

assigning a color value of the at least one color component of each of the pixels in the M by N matrix to a corresponding one of the pixels in said X by Y matrix, said corresponding pixels in said X by Y matrix being separated by a plurality of intervening pixels;

identifying said X coordinate and said Y coordinate of a selected said intervening pixel in said X by Y matrix;

adding a first random number to said X coordinate of said selected intervening pixel to obtain a randomized X coordinate;

adding a second random number to said Y coordinate of said selected intervening pixel to obtain a randomized Y coordinate;

determining a closest one of said corresponding pixels which is closest to a point associated with each of said randomized X coordinate and said randomized Y coordinate; and duplicating the color value of the at least one color component of said closest one of said corresponding pixels in said selected intervening pixel.

19. The method of claim 18, wherein said corresponding pixels in said X by Y matrix are substantially evenly separated in said X direction by a same first number of said intervening pixels, said corresponding pixels in said X by Y matrix being substantially evenly separated in said Y direction by a same second number of said intervening pixels.

20. A method of enlarging a two-dimensional visual image having a plurality of first pixels, the plurality of first pixels including a subset of adjacent first pixels, each of the first pixels having at least one color component, each of the color components having one of a plurality of color values, said method comprising the steps of:

providing a two-dimensional array of second pixels, each of said second pixels having an X coordinate and a Y coordinate;

assigning a color value of the at least one color component of each of the first pixels in the subset of adjacent first pixels to a corresponding one of said second pixels, said corresponding second pixels in said array of second pixels being separated by at least one intervening second pixel;

identifying said X coordinate and said Y coordinate of a selected said intervening second pixel;

adding a first random number to said X coordinate of said selected intervening second pixel to obtain a randomized X coordinate;

adding a second random number to said Y coordinate of said selected intervening second pixel to obtain a randomized Y coordinate;

determining a closest one of said corresponding second pixels which is closest to a point associated with each of said randomized X coordinate and said randomized Y coordinate; and duplicating the color value of the at least one color component of said closest one of said corresponding second pixels in said selected intervening second pixel.

* * * * *